United States Patent Office 3,395,722
Patented Aug. 6, 1968

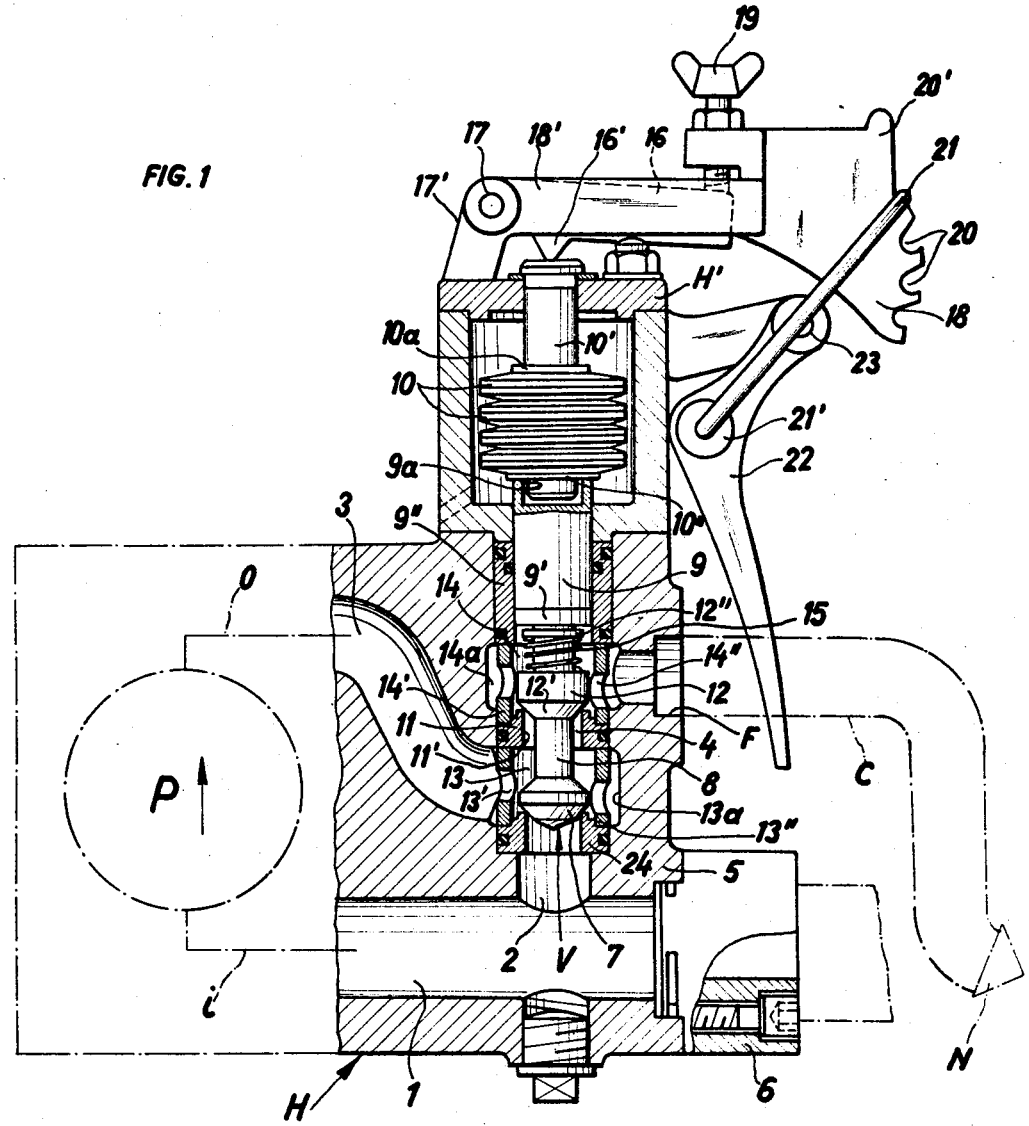

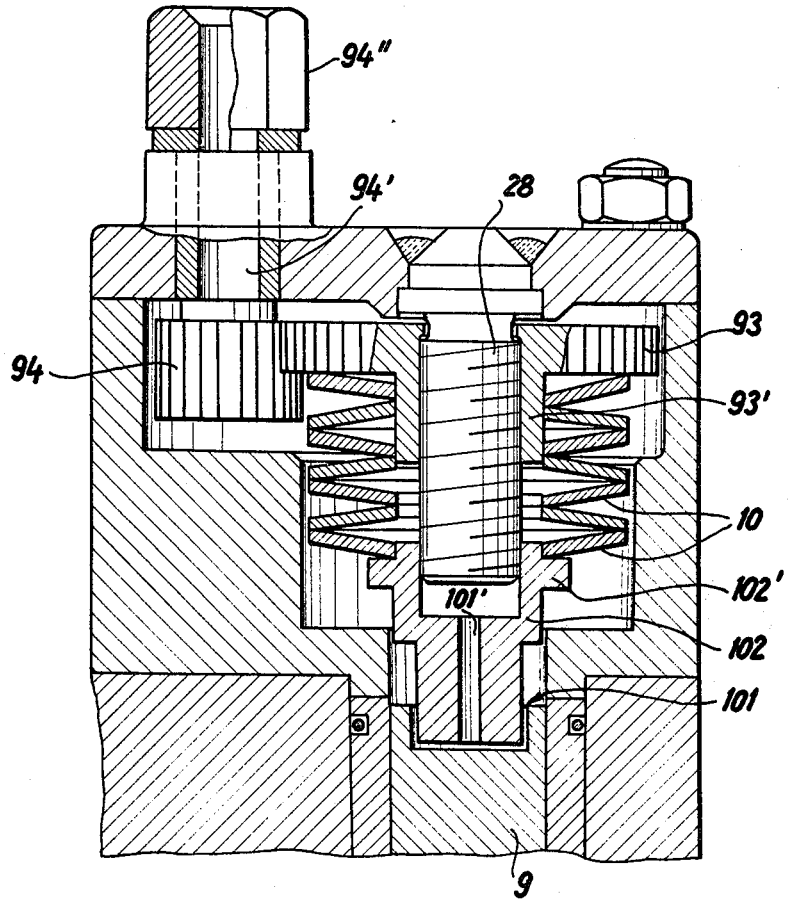

3,395,722
CONTROL VALVE FOR HIGH-PRESSURE PUMPS AND THE LIKE
Willy Heinrich, Rheinkamp-Repelen, Germany, assignor to Woma Apparatebau Wolfgang Maasberg & Co., G.m.b.H., Rheinhausen, Germany
Filed June 15, 1965, Ser. No. 464,055
8 Claims. (Cl. 137—108)

ABSTRACT OF THE DISCLOSURE

A control-valve arrangement for a high-pressure pump which includes a stack of Belleville washers bearing upon a pump piston exposed to fluid pressure at the high-pressure side of the pump and displaceable against the Belleville washers which can be adjustably compressed by coarse and fine adjustments acting upon a rod forming a seat for the Belleville washers, the pump system carrying a first valve member engageable with a seat between the inlet and outlet sides of the pump and a second, spring-loaded valve member engageable with a seat between the discharge side of the pump and the outlet of the valve.

---

My present invention relates to improvements in high-pressure pumps and like systems wherein a fluid is drawn into an inlet side and discharged through an outlet side by fluid-displacement means of such nature as to develop a relatively large pressure differential across the inlet and outlet; more particularly, this invention relates to control-valve arrangements for systems of this type.

In the art of high-pressure pumps, especially those capable of delivering a liquid flow at relatively high velocities and pressures for the mechanical dislodgment of substance from a surface it is common practice to provide a pressure-relief valve between the outlet and the inlet for bypassing liquid to the latter and thereby establishing a circulation within the pump system to prevent overloading of the fluid-displacement means (e.g. impeller) of the pump. Such installations are commonly in use in street-cleaning devices, in apparatuses for the high-pressure flushing of conduits, ducts, canals and sewage systems, and in the surface treatment of bodies with a high-pressure liquid to cleanse these surfaces. In fact, pumping arrangements of this type may be employed with nozzles of the type described and claimed in U.S. Patent No. 3,088,265, issued Mar. 5, 1963, for self-moving hoses and spray heads for the cleaning of waste-disposal systems.

Installations of this character, however, are characterized by certain difficulties arising from the inherent nature of the pumping means and the pressure-relief means hitherto employed. Thus, the pressure-relief or shunt-type valves generally were provided with a passage interconnecting the outlet or high-pressure side of the pump and the inlet or suction side thereof, a spring-biassed valve member being disposed in this passage and held normally in a position in which no return flow of liquid to the inlet resulted. When the pressure at the outlet side exceeded a level determined substantially only by the force of the spring, the valve opened to bypass high-pressure liquid to the inlet, thereby generating a circulation within the pump. In this system, a pressure increase at the discharge side, resulting, for instance, from the closing of the nozzle of the outlet hose or pipe, gave rise to an automatic shunting of fluid from the pressure side to the suction side; concurrently with the relief of the pressure at the suction side, the pressure within the outlet or discharge hose or pipe was relieved by the establishment of a communication between the hose and the suction side. When the nozzle was again opened, therefore, considerable time was required for the buildup of the fluid pressure within the hose, especially if the latter was of considerable length. In installations in which repeated opening and closing of the hose nozzle was required, significant strain was placed upon the entire system because of the need to supply energy to build up pressure before the liquid stream became usable, because of the delay involved in the buildup to the minimum useful pressure, and because of the nonreliability of the system—since the operator could never tell whether the liquids were discharged at a sufficient pressure. Another, not insignificant, disadvantage of the conventional systems was that they required replacement of the pressure-relief valves when the nozzles were changed. Thus, each pressure-relief valve operated with maximum effectiveness only for nozzles of a predetermined capacity. When higher or lower throughputs were required, the relief-valve efficiency fell off and necessitated substitution of others designed for the particular nozzle throughput of interest.

It is, therefore, the principal object of the present invention to provide a control-valve arrangement for high-pressure pumping systems in which the aforedescribed difficulties can be obviated in a relatively simple manner.

A more specific object of this invention is to provide a control valve for high-pressure pumps which will bypass fluid from a pressure side to a suction side and yet sustain an elevated pressure in the outlet conduit supplied by the discharge side.

Another specific object of my present invention is to provide a pressure-relief-type control valve for high-pressure pumps in which replacement of the valve assembly to accommodate different throughputs and discharge pressures is not required.

These objects and others which will become apparent hereinafter are attained, in accordance with the present invention, by the provision of a control-valve arrangement, advantageously built into the pump housing, which comprises a passage interconnecting the outlet or high-pressure side of the pump and its inlet or suction side intermediate the discharge conduit and the fluid-displacement means; a valve member in this passage engageable with a valve seat disposed between the inlet and outlet sides and forming a piston exposed to the pressure at this outlet side and biased thereby away from the valve seat; adjustable spring means loading this valve member against the force of the fluid at the pressure side and biasing the valve member toward this seat; an outlet communicating with this passage and connected with the discharge conduit, pipe or hose to which a closable or interchangeable nozzle is connected; and a further valve body carried by the valve member but shiftable relatively thereto for blocking this outlet upon the pressure in the passage falling below that in the outlet conduit as a consequence of the movement of the valve member away from its seat. It will be immediately apparent that this arrangement will permit the valve member to operate effectively as a pressure-relief valve responsive to increases in fluid pressure at the high-pressure side of the pump and permit it to bypass fluid to the suction side, while the aforementioned valve body blocks return flow or depressurization of the outlet conduit.

According to a more specific feature of the instant invention the spring force is adjusted by a preloading or control means which comprises a spindle coaxial with a stem of the valve member and shiftable relatively thereto in the axial valve-opening and valve-closing directions, the spring means being constituted as compression members disposed between this spindle and the stem while bearing axially upon the latter in the valve-closing direction. In one highly advantageous arrangement of the control means the spindle and stem are telescopingly interconnected and provided with respective shoulders bearing upon the spring means, the spindle means extending outwardly from the housing and being engageable externally thereof by a positioning device forming an adjustable abutment. A first adjusting means can then be provided with a plurality of respective positions in which the abutment means can be latched and corresponding, for example, to discharge nozzles of different capacity; a second adjusting means for fine positioning of the abutment means is then also provided between the coarse-positioning or indexing means and the abutment for permitting accurate setting of the abutment position.

In an alternative construction, the spindle means can include a fixed member telescopingly interconnected between the stem of the piston-like valve member and threadedly receiving a gear member, the spring means bearing upon this gear member and the stem. The gear member can thus be adjusting axially by rotation via a pinion gear whose shaft extends outwardly from the housing.

According to yet a further feature of this invention, the spring means, regardless of the preloading means employed, comprises a stacked array of dished-disk springs or Belleville washers.

The above and other objects, features and advantages of the present invention will become more readily apparent from the following description, reference being made to the accompanying drawing in which:

FIG. 1 is an axial cross-sectional view through a pump housing showing the control-valve arrangement of the present invention, the pump structure, discharge conduit and nozzle being illustrated only schematically; and FIG. 2 is a fragmentary cross-sectional view showing another means for prestressing a spring means suitable for incorporation in the system of FIG. 1 in place of the loading means there shown.

In FIG. 1, I show a pump housing H in which the fluid-displacing means is represented by a pump P within the housing H. It will be understood that this pump P can be of any conventional type employed for the generation of high pressures and for the displacement of fluids at high velocities. In general, the pump will represent a rotor or the like of a centrifugal or of a rotary positive-displacement-type pump although reciprocating pumps may also be employed; suitable pumps for this purpose are described in pages 14–2 to 14–35 of Marks Mechanical Engineers' Handbook, Sixth Edition, McGraw Hill Book Company, 1958. The pump P has an inlet side $i$ with which the suction passage 1 of the pump housing H communicates, and an outlet side $o$ with which the discharge passage 3 is connected. For the purposes of the present invention, passage 1 will be considered as representing the suction or low-pressure side of the pump system while passage 3 represents the high-pressure or outlet side thereof. The housing H is further provided with an outlet or fitting F to which a conduit C (e.g. a high-pressure hose) is attached. This conduit has means at its free end for connecting a plurality of interchangeable nozzles N of different throughput capacity and means for shutting off these nozzles. Between the discharge side $o$ of the pump of the conduit C, there is provided a passage 4 in which the pressure-relief valve means of the present invention is disposed. This passage comprises a chamber 13 communicating with the duct 3 via apertures 13' in a sleeve 13" defining this chamber and fitted into an annular recess 13a of the housing H. Chamber 13 communicates with the bore 11' of an annular seat-forming member 11 which, in turn, is coaxial with and disposed below another sleeve 14' whose apertures 14" communicate with the outlet F via an annular recess 14a. A fitting 6 is attached at the suction bore 1 which communicates via passage 2 with chamber 13, a valve seat 24 being disposed between the high-pressure side 3 and the low-pressure side 1 and serving to connect a suction line to the pump.

Within the passage 4, I provide a valve member which is generally designated V and is provided with a frustoconical closure 7 aligned and engageable with the seat 24. The stem 8 of the valve member V is affixed to the closure 7 and threaded into the piston 9, so as to be axially shiftable therewith. A locking ring 9' is also threaded onto the stem 8 to prevent relative movement of the latter and piston 9.

A check-valve member 12 is axially shiftable upon stem 8 and has a seating portion 12' of frustoconical configuration adapted to engage the valve seat 11. A coil spring 12 surrounding stem 8 bears against a shoulder 12" carried by the stem and threaded onto the latter to permit adjustment of the compression force of spring 12. The piston 9 of the valve member V is axially shiftable within a sleeve 9" which defines a cylinder bore within the housing, annular seals being provided along the inner and outer peripheries of this sleeve to prevent escape of high-pressure liquid from the system. The piston 9 thus constitutes an extension of the valve stem and is telescopingly displaceable relatively to a spindle 10' whose small-diameter end 10" is received within the axial bore 9a of piston 9. Spindle 10' is formed with a shoulder 10a forming a seat for spring means constituted by a stack of Belleville washers 10 which bear upon the end of piston 9.

The spindle 10' of the spring means 10 extends axially through a cover plate H' of the housing and is engageable externally thereof with an adjustable abutment 16' in the form of a point which may be receivable in a conical centerhole of spindle 10'. The abutment 16' is carried by a lever 16 swingably mounted at a pivot 17 upon a trunnion 17' of the housing. A U-shaped member 18, whose shanks 18' enclose lever 16, forms an indexing means whose notches 20 permit coarse preloading of the spring means 10, 10'. For this purpose, the notches are formed in a plate 20' lying in a vertical plane and constituting an arc segment, a D-shaped latch 21 being engageable with the notches 20. Latch 21 is swingably mounted at 21' upon a lever 22 fulcrumed at 23 to the housing H. The latching arrangement 21, 22, according to this invention, is so designed that the pivot 21' is swung into line with the notches 20 and the fulcrum 23 or clockwise beyond the latter in the latched position of the device. This death-center latch prevents the manually operated lever 22 from being opened spontaneously under the pressure of spindle 10'. Fine adjustment of the position of the abutment 16' is effected by a butterfly screw 19 which bears upon the lever 16.

The apparatus of FIG. 1 operates as follows: The Belleville washers 10 serve to urge the spindle 10' and the piston 9 axially apart; when spindle 10' is held by the abutment 16' against upward displacement, the closure member 7 is brought into engagement with the valve seat 24 by the force of the spring means. This force is adjustable in accordance with the desired relief pressure when the operation swings the lever 22 about its fulcrum 23 in the counterclockwise sense; the loop 21 is then inserted in the desired notch 20 and clamped by swinging the lever clockwise until the hinge 21' is aligned with or passes the line connecting fulcrum 23 with the notch 20 in which the unit is latched. A rotation of screw 19 permits fine adjustment of the position of the abutment or any intermediate position of the abutment to be employed.

When the pressure of pump P builds up and is transmitted via line 3 to the passage 4, the valve member V is exposed to the increased fluid pressure. Since the upper surface of closure member 7 and the underside of piston 9 are piston faces effective in opposite directions, fluid pressure is applied differentially to the valve member when the check valve 12 opens. Such opening is permitted when the pressure in chamber 14a falls below that in bore 11' by an amount sufficient to compress the spring 15. Fluid is thus permitted to flow through outlet F to the conduit and the nozzle N. Should the latter be closed, however, the pressure in passage 4 will rise, the differentially operated valve member V will shift against the force of the spring means 10, 10' and closure member 7 will lift to relieve the pressure buildup. The drop in pressure below valve seat 11 will cause the check valve 12 to engage the seat and block return flow from the conduit C. When the nozzle N is then opened, the check valve 12 is again displaced from its seat and fluid permitted to flow to the conduit, closure member 7 again engaging its seat.

In FIG. 2, I show another arrangement for adjusting the compressive force of the Belleville washers 10. In this system, the housing cover is provided with a stub shaft 94' which carries a pinion gear 94 in mesh with a driven gear 93. Rotation of gear 94 is effected from the exterior of the housing by a nut 94" upon which a handle or lever can be mounted. The driven gear 93 has a boss 93' threaded onto a fixedly positioned shaft 28 mounted in the cover plate of the housing and telescopingly received in a guide bushing 102 which, in turn, is received at 101 in the piston 9. A bore 101' prevents compression of fluid by the telescoping movement of bushing 102 and threaded shaft 28. The bushing 102 is provided with a shoulder 102' against which the Belleville washers 10 are seated, these washers surrounding the tubular boss 93' which here serves as a spindle axially shiftable to compress the washers 10 upon threading engagement with the shaft 28. Rotation of the gear 95 in one direction will compress the Belleville washers 10 while rotation in the opposite sense will relieve them. Here the gear 93 serves as an adjustably positionable abutment for the spring means.

The invention described and illustrated is believed to admit of many modifications within the ability of persons skilled in the art, all such modifications being considered within the spirit and scope of the appended claims.

I claim:

1. A control-valve arrangement for a high-pressure-pump system adapted to be connected with a fluid conduit and having a high-pressure side connectable with said conduit and a low-pressure side for supplying fluid to the pump, said control-valve arrangement comprising:
   housing means forming a passage interconnecting said high-pressure side, said low-pressure side and said conduit;
   a first valve seat along said passage between said high-pressure side and said low-pressure side, and a second valve seat along said passage between said high-pressure side and said conduit;
   a valve member displaceable in said passage and provided with a valve closure engageable with said first valve seat;
   spring means bearing upon said valve member for urging said closure in the direction of said first seat, said valve member forming a piston exposed to pressure of fluid at said high-pressure side for shifting said closure against the force of said spring means away from said first seat upon the development of a fluid pressure within said passage in excess of a predetermined pressure value associated with the force of said spring means;
   a check-valve body carried by said valve member and engageable with said second seat for blocking flow of fluid from said conduit to said low-pressure side upon the pressure in said passage falling below that in said conduit; and
   control means for adjusting the force of said spring means, said valve member being formed with an axially shiftable stem, said control means including an axially displaceable spindle shiftable relatively to said stem, said spring means comprising a compression spring interposed between said stem and said spindle and bearing axially thereon;
   adjustably positionable abutment means engageable with said spindle for retaining same at selected positions in accordance with the predetermined force of said spring, coarse-adjusting means for disposing said abutment means at a plurality of spaced-apart positions and fine-adjusting means for accurate adjustment of the position of said abutment means between said positions.

2. A control-valve arrangement as defined in claim 1 wherein said spring means comprises a stack of Belleville washers bearing upon said valve member.

3. A control-valve arrangement as defined in claim 1 wherein said control means comprises a lever fulcrumed on said housing means and engageable with said spindle to constitute said abutment means, indexing means having a U-shaped portion with shanks pivoted at the fulcrum of said lever and receiving said lever between them while being swingable relatively to said lever, said indexing means forming said coarse-adjusting means and having a plurality of spaced-apart notches, latch means swingably mounted on said housing means and having a loop engageable in a selected one of said notches for retaining said indexing means in a corresponding one of the coarse positions of adjustment of said control means, and screw means forming said fine-adjusting means and disposed between said indexing means and said lever for relatively displacing same.

4. A control-valve arrangement for a high-pressure-pump system adapted to be connected with a fluid conduit and having a high-pressure side connectable with said conduit and a low-pressure side for supplying fluid to the pump, said control-valve arrangement comprising:
   housing means forming a passage interconnecting said high-pressure side, said low-pressure side and said conduit;
   a first valve seat along said passage between said high-pressure side and said low-pressure side, and a second valve seat along said passage between said high-pressure side and said conduit;
   a valve member displaceable in said passage and provided with a valve closure engageable with said first valve seat;
   spring means bearing upon said valve member for urging said closure in the direction of said first seat, said valve member forming a piston exposed to pressure of fluid at said high-pressure side for shifting said closure against the force of said spring means away from said first seat upon the development of a fluid pressure within said passage in excess of a predetermined pressure value associated with the force of said spring means;
   a check-valve body carried by said valve member and engageable with said second seat for blocking flow of fluid from said conduit to said low-pressure side upon the pressure in said passage falling below that in said conduit; and
   control means for adjusting the force of said spring means, said valve member being formed with an axially shiftable stem, said control means including an axially displaceable spindle shiftable relatively to said stem, said spring means comprising a compression spring interposed between said stem and said spindle and bearing axially thereon;
   said spindle being threaded onto said housing for concurrent rotation and axial displacement relatively thereto, and gear means coupled with said spindle and actuatable externally of said housing means for adjusting the precompression of said spring.

5. A control-valve arrangement as defined in claim 4 wherein said gear means includes a driven gear carried by said stem, a pinion gear enmeshed with said driven gear and journaled in said housing means, and a shaft keyed to said pinion gear and extending from said housing means for rotating said gears.

6. A control-valve arrangement for a high-pressure-pump system adapted to be connected with a fluid conduit and having a high-pressure side connectable with said conduit and a low-pressure side for supplying fluid to the pump, said control-valve arrangement comprising: housing means forming a passage interconnecting said high-pressure side, said low-pressure side and said conduit; a first valve seat along said passage between said high-pressure side and said low-pressure side, and a second valve seat along said passage between said high-pressure side and said conduit; a valve member displaceable in said passage and provided with a valve closure engageable with said first valve seat; spring means bearing upon said valve member for urging said closure in the direction of said first seat, said valve member forming a piston exposed to pressure of fluid at said high-pressure side for shifting said closure against the force of said spring means away from said first seat upon the development of a fluid pressure within said passage in excess of a predetermined pressure value associated with the force of said spring means; and a check-valve body carried by said valve member and engageable with said second seat for blocking flow of fluid from said conduit to said low-pressure side upon the pressure in said passage falling below that in said conduit, said passage being formed as an axially extending bore, said high-pressure side opening into said bore at an intermediate location therealong, said low-pressure side opening into said bore at a location spaced from said intermediate location and said conduit opening into said bore at a location spaced from said intermediate location and remote from said low-pressure side, said first and second valve seats being disposed of opposite sides on said intermediate location, said valve member being formed with said piston at a location remote from said closure, said check-valve body being disposed along said valve member intermediate said closure and said piston, said arrangement further comprising other spring means on said valve member urging said body toward said second seat.

7. A control-valve arrangement as defined in claim 6 wherein said piston and said closure form a differential piston responsive to the fluid pressure in said passage.

8. A control-valve arrangement for a high-pressure pump adapted to be connected with a fluid conduit and having a high-pressure side connectable with said conduit and a low-pressure side for supplying fluid to the pump, said control-valve arrangement comprising:

housing means forming a passage interconnecting in succession said low-pressure side, said high pressure side and said conduit;

a first annular valve seat along said passage between said high-pressure side and said low-pressure side, and a second annular valve seat along said passage between said high-pressure side and said conduit;

a valve member axially shiftable in said passage provided with a valve stem, a valve body engageable with said first valve seat at one end of said stem, a check-valve body carried by said valve stem and shiftable thereon while being spring-biased in the direction of said second valve seat for engagement therewith, and a piston at the other end of said valve stem exposed to the pressure of fluid at said high-pressure side for displacing said valve member away from said first seat;

a compression spring bearing with one end of said spring upon said valve member at said other end of said stem for yieldably restraining said valve member against movement away from said first seat; and adjusting means including a rod bearing against the other end of said compression spring for varying the resistance thereof to displacement of said valve member, said adjusting means including a mechanism operable externally of said housing means for axially shifting said rod.

References Cited

FOREIGN PATENTS 519,429    3/1940    Great Britain.

WILLIAM F. O'DEA, *Primary Examiner.*

W. H. WRIGHT, *Assistant Examiner.*